March 9, 1926.
A. A. ALLEMAND
TRAY
Filed Sept. 10, 1925
1,576,294
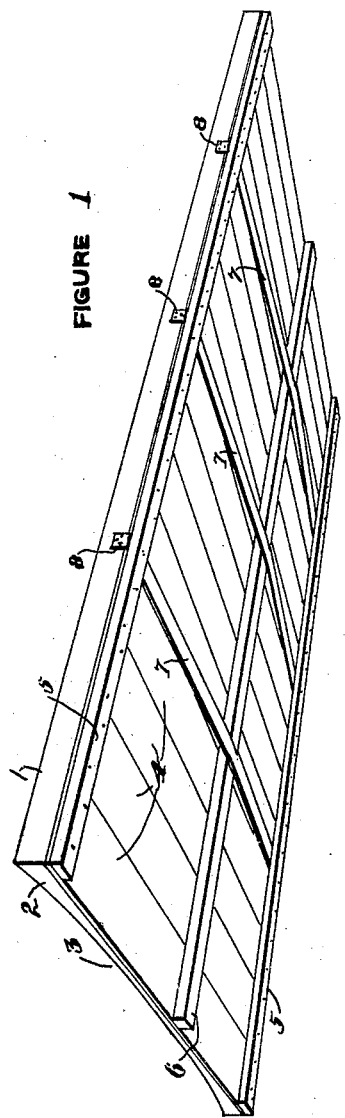
INVENTOR
Albert A. Allemand
BY John A. Aaronsmith
ATTORNEY Patented Mar. 9, 1926.

1,576,294

UNITED STATES PATENT OFFICE.

ALBERT A. ALLEMAND, NEAR GILROY, CALIFORNIA.

TRAY.

Application filed September 10, 1925. Serial No. 55,576.

*To all whom it may concern:*

Be it known that I, ALBERT A. ALLEMAND, a citizen of the United States, and residing near Gilroy, in the county of Santa Clara and State of California, have invented certain new and useful Improvements in Trays, of which the following is a specification.

This invention relates particularly to the construction of that type of trays commonly used in the drying of prunes in dehydrators.

In preparing the fruit for the dehydration process, they are first processed by dipping in a lye solution for the purpose of checking the skins so that the moisture content may be more readily extracted therefrom.

Since it is necessary, in order to secure the best results, that each prune be exposed as completely as possible to the current of air passing through the dehydrator, it is customary to spread them loosely upon broad shallow wooden trays. The tray is built up of a rectangular frame three or four feet wide and six or eight feet long. This frame is rigid and is enclosed on one side with thin material commonly known as "shakes" to form the bottom of the tray.

When the processed prunes are spread upon the trays preparatory to placing in the dehydrator the tray bottoms become more or less filled with moisture, the centers of the trays naturally receiving more moisture than the sides. Now, when these trays are stacked one upon another in the dehydrator, the dry air passing through the dehydrator is passed over and under each tray and its contents, picking up moisture in its travels and gradually drying out the tray and extracting the moisture content from the prunes, the tray being so constructed at the ends as to permit the air to readily pass therethrough.

Since the shakes forming the bottoms of these trays are thin and of rather inferior material and are securely fastened at both ends, the heat and moisture together with the weight of the prunes thereon, causes many of the shakes to warp so badly as to reach the fruit in the tray below and closing the space normally intervening between each two trays. When this occurs the circulation of air is seriously interrupted or impeded, with the result that when most of the prunes are sufficiently dried many trays are partially filled with prunes that are but partly dried, thereby creating a condition difficult to correct except at additional expense of time and labor.

It is the object of the present invention to provide a means for supporting and strengthening the bottom of the drying tray in such a manner as to effectually prevent the warping of the bottom boards and thereby insure the proper circulation of the dehydration air above and below the tray.

In the drawing:—

Figure 1 is a perspective view of a tray embodying my invention.

Figure 2 is a transverse section through the same.

Referring more particularly to the drawing, I show at 1—1 and 2—2 the two side and the two end pieces of a drying tray, the ends having a portion of their upper edges cut away as at 3 in order to permit air to circulate therethrough when the tray is placed thereon.

At 4 are shown a number of "shakes" arranged transversely of the frame 1—2 and held in place by narrow strips 5 nailed therethrough and to the side pieces 1—1 as shown. The structure thus far described constitutes a drying tray as ordinarily constructed.

In effecting my invention, I first secure a strip 6 on the bottom of the tray and along its longitudinal axis, this strip preferably being somewhat thicker than the side strips.

At 7—7 are shown three metal straps, each strap passing under the side strips 5—5 and turned upwardly and nailed to the outside of sides 1—1 of the tray as shown at 8. The center of each strap passes over the center strip 6 and therefore forms a truss that effectually supports the centers of all of the shakes 4 and prevents them from warping below their normal plane and interfering with the circulation of the air passing thereunder.

This truss construction cooperates with the specific form of tray construction because the recessed end portions 3 permit a free circulation of air therethrough and also permit the use of a center strip 6 of greater thickness than the said strips 5—5 whereby the truss effect is secured.

It is to be understood, of course, that while I have herein shown and described but one specific embodiment of the invention, changes in form and construction may be made within the scope of the appended claim.

I claim:—

A drying tray comprising a rigid rectangular frame having its ends recessed from one side and a bottom of thin material normally easily warped when subjected to heat and moisture, a supporting strip positioned on the bottom of said material along its longitudinal axis, straps arranged transversely of said tray over the outer edge of said strip and secured to the opposite sides of the tray, and strips mounted upon the ends of the bottom material and passing over said straps and extending the length of said tray.

ALBERT A. ALLEMAND.